(12) United States Patent
Stec et al.

(10) Patent No.: US 9,494,113 B2
(45) Date of Patent: Nov. 15, 2016

(54) FLEXIBLE TURBOCHARGER AIR DUCT WITH CONSTRICTING RINGS

(71) Applicant: FORD GLOBAL TECHNOLOGIES, LLC, Dearborn, MI (US)

(72) Inventors: Randall A. Stec, Canton, MI (US); Roger Khami, Troy, MI (US); Christopher B. Bishop, South Lyon, MI (US); Erik H. Hermann, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 292 days.

(21) Appl. No.: 14/133,876

(22) Filed: Dec. 19, 2013

(65) Prior Publication Data
US 2015/0176547 A1 Jun. 25, 2015

(51) Int. Cl.
*F16L 17/00* (2006.01)
*F02M 35/10* (2006.01)

(52) U.S. Cl.
CPC . *F02M 35/10144* (2013.01); *F02M 35/10137* (2013.01); *F02M 35/10157* (2013.01); *F02M 35/10321* (2013.01); *F02M 35/10354* (2013.01); *Y02T 10/144* (2013.01)

(58) Field of Classification Search
CPC ............. F02M 35/10144; F02M 35/10137; F02M 35/10157
USPC ................. 285/114, 242, 252, 337
See application file for complete search history.

(56) References Cited

U.S. PATENT DOCUMENTS

| 4,559,782 | A |  | 12/1985 | Ritchey et al. |  |
|---|---|---|---|---|---|
| 4,989,643 | A |  | 2/1991 | Walton et al. |  |
| 5,620,209 | A |  | 4/1997 | Sauer |  |
| 5,791,144 | A |  | 8/1998 | Thompson |  |
| 5,915,739 | A | * | 6/1999 | Cradduck | F16L 33/03 285/114 |
| 6,354,937 | B1 | * | 3/2002 | Crook | F24F 3/044 138/106 |
| 7,644,956 | B2 | * | 1/2010 | Crook | F16L 35/00 285/114 |
| 7,699,036 | B2 |  | 4/2010 | Bock et al. |  |
| 2008/0184704 | A1 |  | 8/2008 | Bock et al. |  |
| 2009/0229697 | A1 |  | 9/2009 | Schelhaas et al. |  |
| 2013/0167964 | A1 |  | 7/2013 | Brettschneider |  |
| 2013/0180615 | A1 |  | 7/2013 | Ragner et al. |  |

FOREIGN PATENT DOCUMENTS

EP 2562409 A1 2/2013

* cited by examiner

*Primary Examiner* — Aaron Dunwoody
(74) *Attorney, Agent, or Firm* — Gregory P. Brown; MacMillan, Sobanski & Todd, LLC

(57) ABSTRACT

A turbocharger system includes a flexible duct having an elongated elastomeric body extending longitudinally between first and second ends configured to attach to respective turbocharger devices. A plurality of constricting rings are spaced longitudinally between the ends. Each constricting ring applies a radial compression force around a respective circumference of the duct. Each ring is comprised of a molded thermoplastic retained in a concentric shape by a clasp. The spacing of the constricting rings has a density sufficient to limit a volume increase of the duct under turbocharger operating pressure to less than 20%.

12 Claims, 8 Drawing Sheets

FLEXIBLE TURBOCHARGER AIR DUCT WITH CONSTRICTING RINGS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to turbocharger systems for motor vehicles with internal combustion engines, and, more specifically, to air ducts for moving pressurized air between separate components within a turbocharged system.

Turbo systems can increase the power derived from an internal combustion engine by compressing the intake air provided to the engine. Turbochargers require ducting to move air from a compressor to a charge air cooler, and then to a throttle body on the engine. Elastomeric duct sections are typically used in order to provide easy installation, to accommodate variable alignment/distances between the components being joined, and to handle engine vibration or roll during vehicle operation.

The elastomeric duct sections typically experience internal air pressures of up to 3.5 bar, for example. Moreover, the ducts are typically exposed to high temperatures. The high temperatures and pressures may cause an air duct or hose to expand during turbocharger operation. Such a change in shape could have several drawbacks. The inflation of the duct outside diameter can cause interference with surrounding components, potentially resulting in abrasion of the duct surface, breaking of mounting brackets, burst hoses (resulting in lack of power), or slow leaks with a resulting hissing noise. In addition, a unrestrained pressurized duct surface can result in radiated sound from the turbocharger that reaches the passenger compartment, causing unacceptable noise disturbances to the passengers.

To address the foregoing issues, some kind of duct reinforcement is typically provided. One known approach has been to provide a metal helix (i.e., a slinky-shaped body) around the duct and then covering the duct and helix with a heat shrink polymeric sock. This results in a greatly increased manufacturing cost, as well as a greater difficulty of installation due to a higher stiffness.

Another approach has been to use composite, multi-layered charge air ducts with reinforcing plies and specialized polymers. Such composite ducts suffer the same drawbacks, such as increased manufacturing costs and environmental issues.

SUMMARY OF THE INVENTION

The present invention overcomes the disadvantages of the prior art by limiting duct expansion at a very low cost while maintaining use of conventional rubber materials for the elastomeric duct.

In one aspect of the invention, a turbocharger system comprises a flexible duct having an elongated elastomeric body extending longitudinally between first and second ends configured to attach to respective turbocharger devices. A plurality of constricting rings are spaced longitudinally between the ends. Each constricting ring applies a radial compression force around a respective circumference of the duct. Each ring is comprised of a molded thermoplastic retained in a concentric shape by a clasp. The spacing of the constricting rings has a density sufficient to limit a volume increase of the duct under turbocharger operating pressure to less than 20%.

DETAILED DESCRIPTION OF PREFERRED EMBODIMENTS

Figure 1:
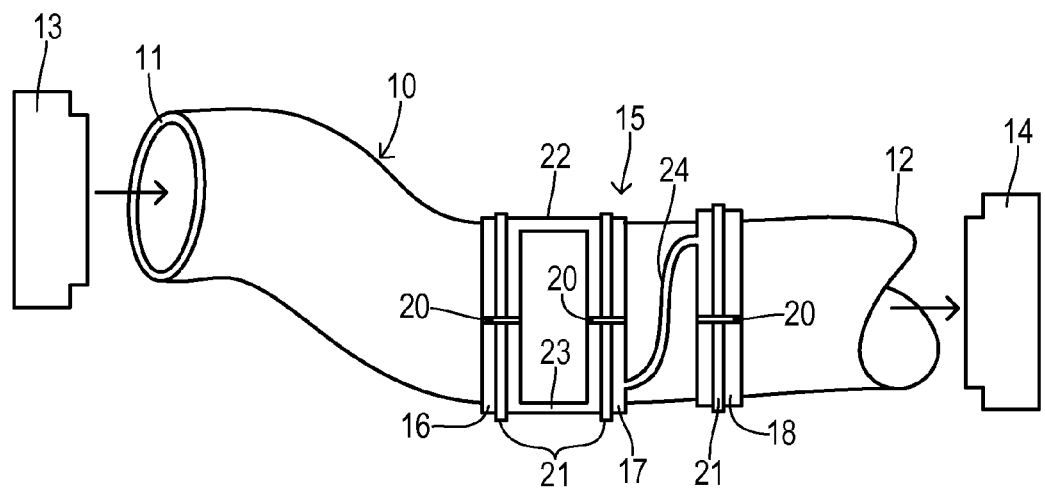
FIG. 1 is a plan view of an elastomeric duct carrying a plurality of constricting rings of the present invention.

Referring now to FIG. 1, a flexible air duct 10 has an elongated elastomeric body extending longitudinally between a first end 11 and second end 12. Ends 11 and 12 are configured to attach to respective turbocharger devices, such as a compressor 13 and a charge air cooler 14. A set of constricting rings 15 has individual rings 16, 17, and 18 spaced longitudinally between ends 11 and 12. Each ring 16-18 applies a radial compression force around a respective circumference of duct 10. The compression force limits local expansion of duct 10 when subjected to turbocharger operating pressure (which may rise to between 25 and 35 psi, for example). By appropriate spacing of the rings, a density (e.g., the aggregate longitudinal width of all the rings divided by the longitudinal length of duct 10 between devices 13 and 14) is obtained which is sufficient to limit a volume increase of duct 10 under turbocharger operating pressure to less than about 20% (as compared to the expansion that would occur without the presence of constricting rings 16-18). More preferably, the volume increase of duct 10 may be limited to less than about 10%.

To obtain an overall low cost for the system, constricting rings 16-18 are each comprised of a molded thermoplastic.

Each molded ring is installed over (e.g., clamped onto) duct 10 and is retained concentrically on duct 10 by a respective clasp (not shown) that closes each ring. To facilitate placement over duct 10, each ring 16-18 may preferably include a living hinge 20 formed by molding a thin lateral portion in the ring. For added strength, each ring 16-18 may include a concentric strengthening rib 21 on its outer surface.

To maintain a desired spacing of rings 16-18, one or more linking ribs 22-24 may be provided. Each linking rib 22-24 extends between adjacent constricting rings and is preferably integrally molded therewith. Linking ribs 22 and 23 extend substantially straight between constricting rings 16 and 17, and they may preferably be diametrically opposed on opposite sides of living hinge 20. By being placed substantially perpendicularly to rings 16 and 17, linking ribs 22 and 23 provide a maximum stiffness longitudinally between rings. A single rib between rings or more than two rings can also be employed.

Relative longitudinal movement between rings (i.e., in the axial direction of duct 10) may be provided by using a linking rib 24 having a serpentine path running substantially along an outer surface of duct 10. The serpentine shape can act as a spring that flexes as the distance between rings contracts or expands. Use of a serpentine linking rib near an end of duct 10 may facilitate installation of duct 10 within the turbocharger system.

Figure 2:
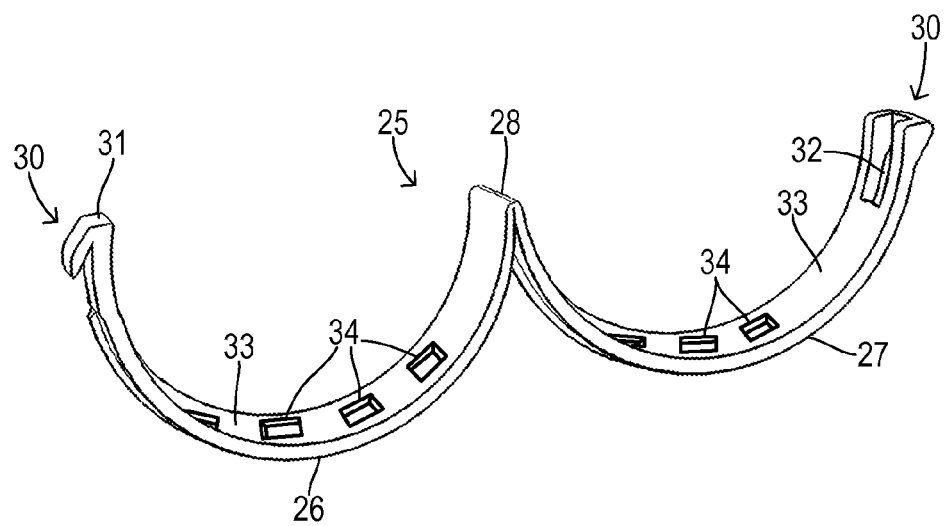
FIG. 2 is a perspective view of a first embodiment of a molded constricting ring in an open state.
Figure 3:
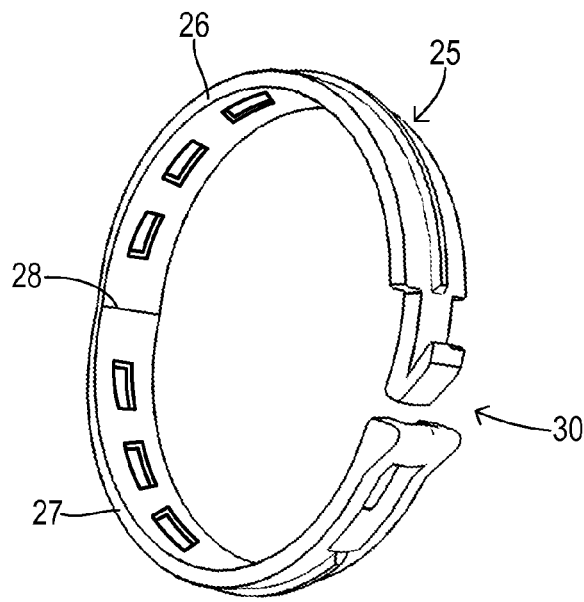
FIG. 3 is a perspective view of the constricting ring of FIG. 2 in a nearly closed state.

A basic form for a first embodiment of a constricting ring 25 is shown in FIG. 2. Ring 25 is formed from a substantially rigid, molded thermoplastic such as PVC with first and second jaws 26 and 27 joined by a living hinge 28. As molded, ring 26 is in an open state shown in FIG. 2. By pivoting about hinge 28, a state as shown in FIG. 3 can be obtained during closing of ring 25 wherein a clasp 30 locks ring 25 by the insertion of a tab 31 into a slot 32. An inside surface 33 defines an inside diameter configured to be slightly less than an outside diameter of the air duct when ring 25 is closed. By providing a slight radial compression force even while the air duct is unpressurized, ring 25 remains at a desired position on the air duct. To increase the anchoring effect of constricting ring 25 at a fixed location on the air duct, inner surface 33 preferably includes one or more intrusion features at a central portion of surface 33 so that a portion of the elastomeric duct expands and enters the intrusion feature. In the embodiment of FIGS. 2 and 3, intrusion pockets 34 are spaced along the circumference of inner surface 33. Pockets 34 can be depressions or may extend completely through first and second jaws 26 and 27, for example.

Figure 4:
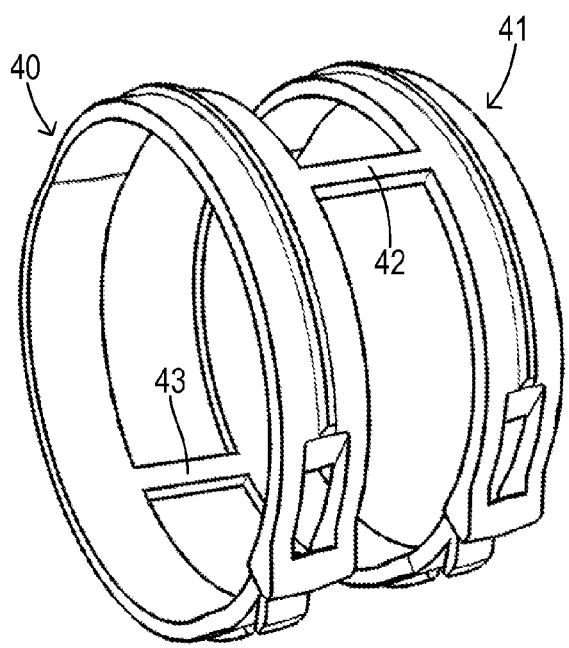
FIG. 4 is a perspective view of constricting rings joined by straight linking ribs.

As shown in FIG. 4, adjacent constricting rings 40 and 41 may preferably be strung together via linking ribs extending longitudinally between and connected to adjacent rings for generally maintaining a desired spacing between the rings. As shown in FIG. 4, linking ribs 42 and 43 may preferably be integrally molded with adjacent rings 40 and 41. If desired, a greater number than 2 constricting rings can be integrally molded together with respective linking ribs between adjacent pairs of rings to constrict expansion over a longer section of air duct. Besides being substantially straight and oriented substantially perpendicular to the adjacent rings, the linking ribs can also be arranged at other orientations to accommodate other duct shapes or orientations.

Figure 5:
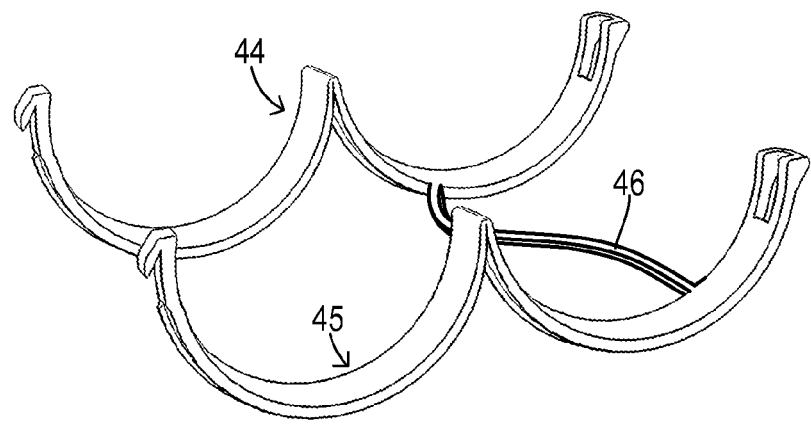
FIG. 5 is a perspective view of constricting rings joined by a serpentine linking rib.

FIG. 5 shows an alternative embodiment wherein rings 44 and 45 are connected by a linking rib 46 that follows a serpentine path in order to act as a spring to allow a range of axial movement between rings 44 and 45. Rib 46 is integrally molded with rings 44 and 45.

Figure 6:
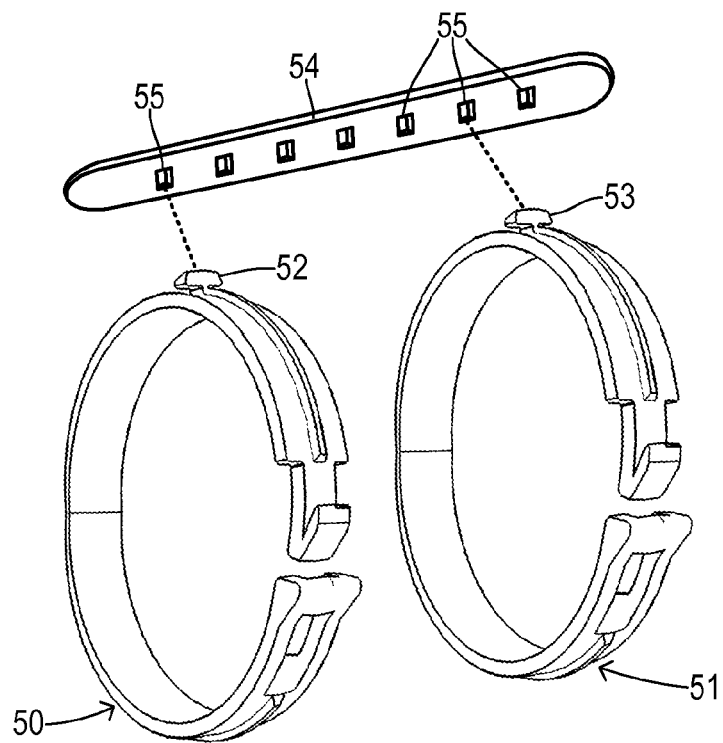
FIG. 6 is an exploded, perspective view of constricting rings joined by a linking rib formed as a separate strap.

FIG. 6 shows yet another embodiment for a linking rib wherein adjacent constricting rings 50 and 51 each includes an outwardly projecting nub 52 and 53 for capturing by a planar strap 54 in spaced receiving-apertures 55. The linking of adjacent rings can be performed either before or after installing the rings on an air duct by snapping nubs 52 and 53 into matching apertures 55.

Figure 7A:
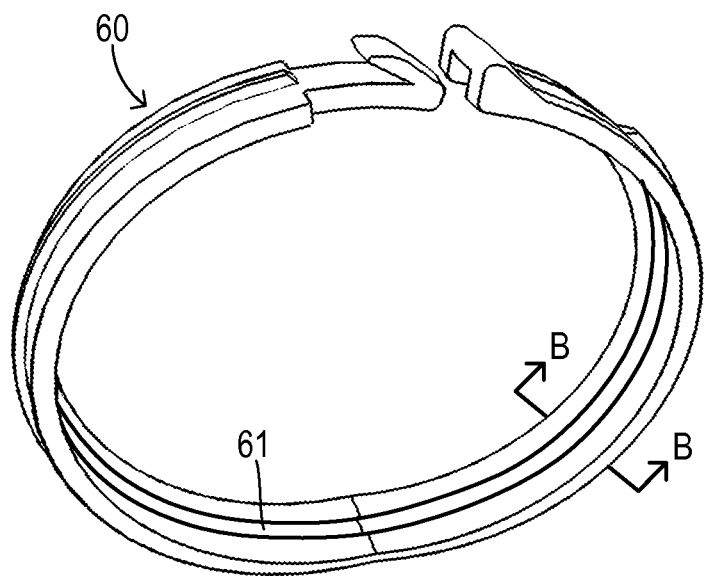
FIG. 7A is a perspective view of an constricting ring with an oblate shape.
Figure 7B:
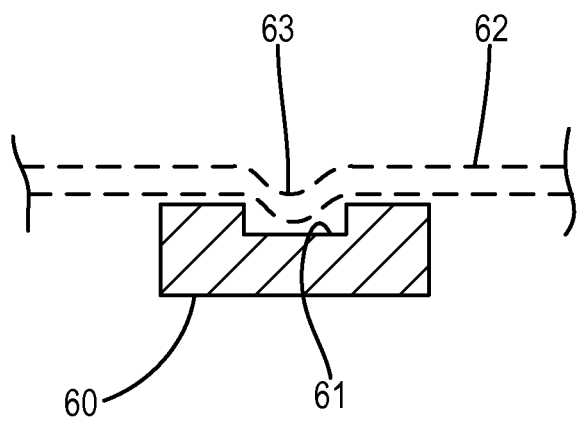
FIG. 7B is a cross-sectional view along line B-B of FIG. 7A.

As shown in FIG. 7A, the cross-sectional shape of an internal passage inside a closed constricting ring 60 need not be circular. For example, an air duct may have a non-circular cross section. Alternatively, it may be desirable to distort a circular air duct from its round shape in order to facilitate bending of the duct to avoid other engine components. Thus, an oblique shape can be provided for a constricting ring 60 which could be arranged with its minor internal diameter radially aligned in the direction of a bending air duct, for example. Also shown in FIG. 7A is a substantially cylindrical groove 61 sunk into the inner ring surface for creating an intrusion feature that helps anchor ring 60 onto the air duct. As shown in cross section in FIG. 7B, after constricting ring 60 is placed over an air duct 62, the snapping closed of ring 60 causes a radial compression force around duct 62 which results in an expanded portion or fold 63 of duct 62 entering groove 61. Thus, a single constricting ring can be strongly anchored in a fixed position to withstand vibrations even in the event that no linking ribs are employed.

Figure 8:
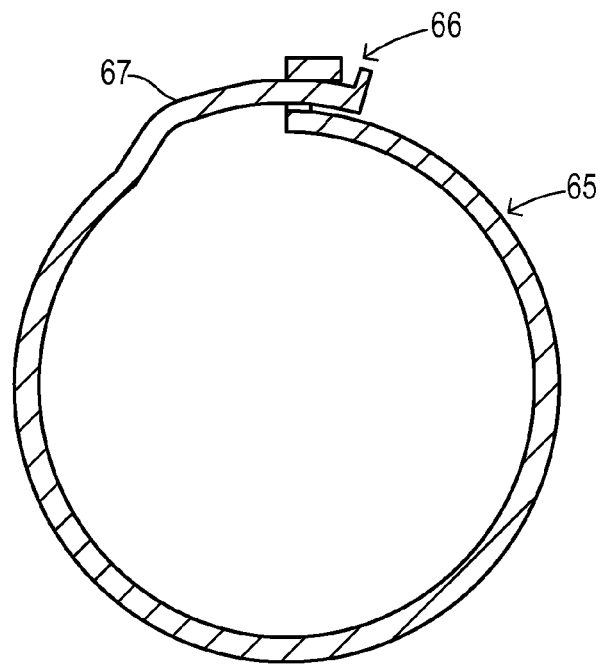
FIG. 8 is a cross section of an alternative embodiment for the constricting ring.
Figure 9:
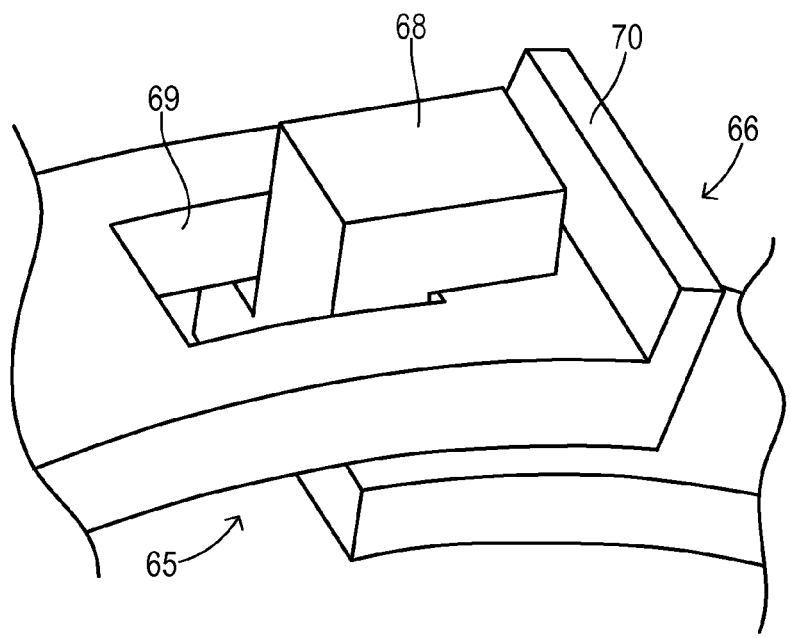
FIG. 9 is a perspective view showing the clasp of FIG. 8 in greater detail.
Figure 10:
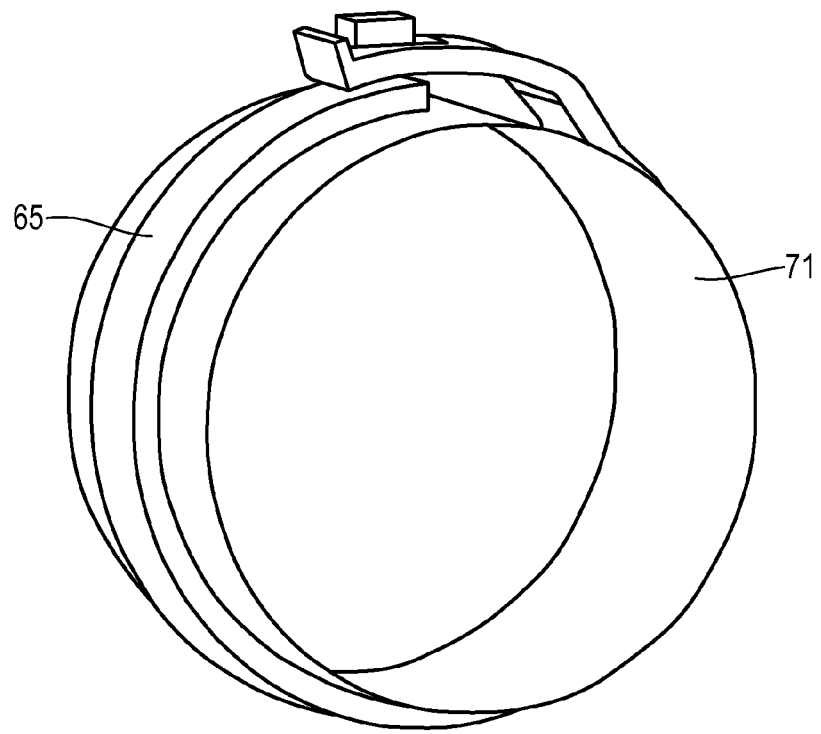
FIG. 10 is a perspective view of the constricting ring of FIG. 8 on a portion of a duct.

FIGS. 8 and 9 show an alternate embodiment of a constricting ring 65 having a clasp 66. Ring 65 is integrally molded using a moderately firm thermoplastic material into a shape having a spring arm 67 that is deflectable to accommodate variations in the size of an air duct. Clamps 66 includes a hook tab 68 projecting from one end of ring 65 for being captured in a slot 69 in the other end of ring 65. A grip 70 is provided for facilitating manipulation of the slotted end when either clasping or unclasping clasp 66. Spring arm 67 has a bent shape configured to provide nearly the same radial compression force when ring 65 is installed over a range of air duct outside diameters. FIG. 10 shows ring 65 mounted on a section of an air duct 71.

Figure 11:
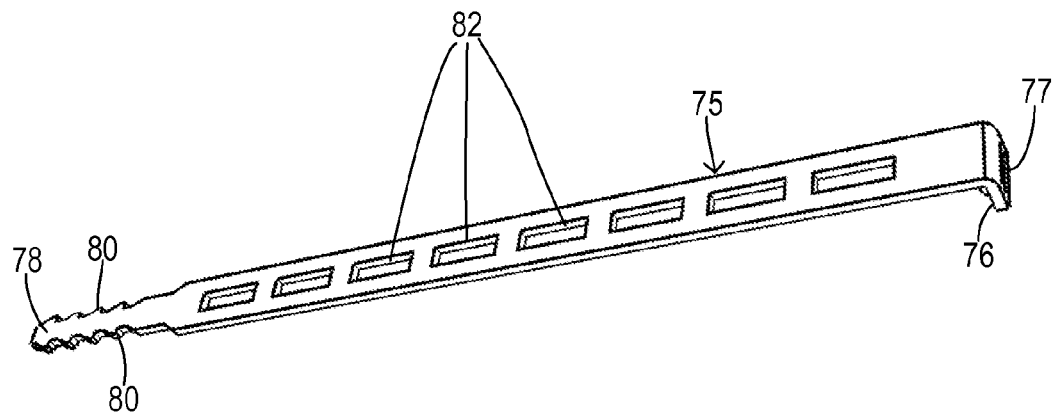
FIG. 11 is a perspective view of an alternative embodiment of a molded constricting ring formed as a bendable strip with a clasp at the ends.
Figure 12:
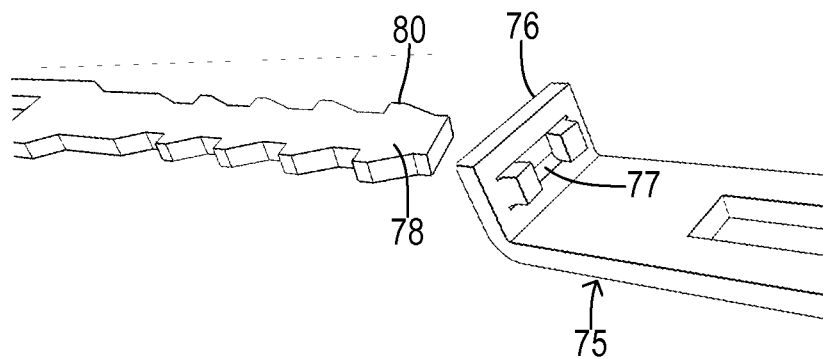
FIG. 12 is a perspective view of the ends of the strip in FIG. 11 brought together for being clasped.
Figure 13:
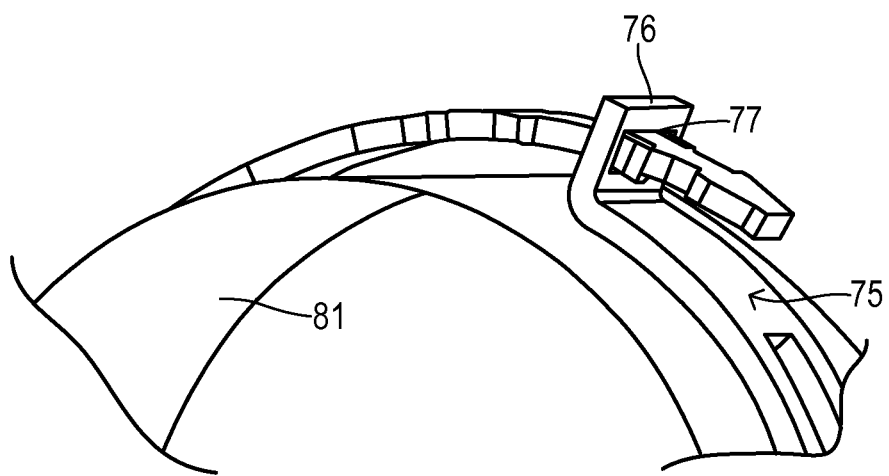
FIG. 13 is a partial perspective view of the strip of FIG. 11 installed on a duct.

As shown in FIGS. 11 and 12, a constricting ring 75 may be formed of a molded, bendable strip. In order to be bendable, a softer thermoplastic material may be employed. Ring 75 is molded flat and is installed by wrapping around an air duct and closing a clasp in order to form a ring that applies a radial compression force around a respective circumference of the duct. Moreover, the clasp may be adjustable in order to adapt the circumferential size of a constricting ring to a particular air duct size. Thus, constricting ring 75 has an end wall 76 with a slot 77. A second end 78 of ring 75 includes a series of ramped teeth for ratcheting through slot 77 until a desired circumference is obtained. Intrusion features 82 help anchor ring 75 onto the duct. FIG. 13 shows ring 75 installed on a portion of a duct 81. Depending on the axial length of an air duct, an appropriate number of constricting rings would be installed, that could preferably joined by linking ribs (not shown) either integrally molded with the bendable strips or that can be snapped onto the rings.

Figure 15:
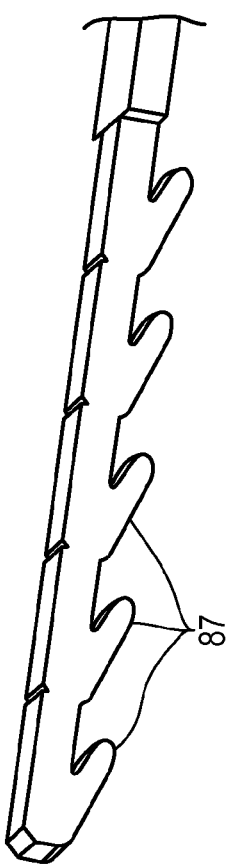
FIGS. 14-16 are perspective views showing an alternative embodiment of a strip with an alternate clasp arrangement.
Figure 16:
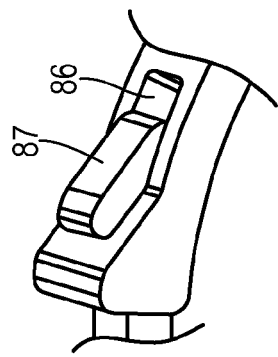
Figure 14:
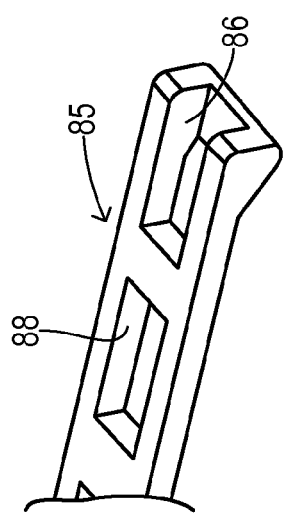

FIGS. 14-16 show an alternative embodiment of a constricting ring 85 formed as a bendable strip. Strip 85 includes a clasp having a slot 86 at one end and a plurality of angled teeth 87 at the other end for selectively capturing a desired one of teeth 87 in slot 86. Preferably, strip 85 includes a plurality of apertures 88 for providing the intrusion feature to anchor strip 85 as a constricting ring on an air duct. To further stabilize the position of a constricting ring, linking ribs (not shown) can also be added as described above.

What is claimed is:

1. A turbocharger air-transfer system comprising:
   a flexible duct having an elongated elastomeric body extending longitudinally between first and second ends configured to attach to respective turbocharger devices; and
   a plurality of constricting rings spaced longitudinally between the ends, each constricting ring applying a radial compression force around a respective circumference of the duct, wherein each ring is comprised of a molded thermoplastic being retained in a concentric shape by a clasp, wherein each constricting ring comprises first and second jaws joined by a living hinge, and wherein the spacing of the constricting rings has a density sufficient to limit a volume increase of the duct under turbocharger operating pressure to less than 20%.

2. The system of claim 1 wherein each clasp is comprised of a tab on the first jaw and a slot in the second jaw at the ends of the jaws opposite from the living hinge, and wherein the tab is captured by inserting into the slot.

3. The system of claim 1 further comprising:
   a linking rib extending longitudinally between and connected to adjacent constricting rings to generally maintain spacing between the constricting rings.

4. The system of claim 3 wherein the linking rib is integrally molded with the adjacent constricting rings from the same molded thermoplastic.

5. The system of claim 4 wherein the linking rib is substantially straight and is oriented substantially perpendicular to the adjacent constricting rings.

6. The system of claim 4 wherein the linking rib follows a serpentine path substantially along an outer surface of the duct.

7. The system of claim 1 wherein the spacing of the constricting rings has a density sufficient to limit the volume increase of the duct under turbocharger operating pressure to less than 10%.

8. A turbocharger air-transfer system comprising:
   an elastomeric duct extending longitudinally between respective turbocharger devices; and
   a plurality of molded thermoplastic constricting rings with first and second jaws joined by a living hinge each applying a radial compression force to the duct and each retained in a concentric shape by a clasp, wherein spacing of the constricting rings has a density sufficient to limit a duct volume increase under turbocharger operating pressure to 20%.

9. The system of claim 8 wherein each clasp is comprised of a tab on the first jaw and a slot in the second jaw at the ends of the jaws opposite from the living hinge, and wherein the tab is captured by inserting into the slot.

10. The system of claim 8 further comprising:
    a linking rib extending longitudinally between and connected to adjacent constricting rings to generally maintain spacing between the constricting rings.

11. The system of claim 10 wherein the linking rib is integrally molded with the adjacent constricting rings from the same molded thermoplastic, and wherein the linking rib is substantially straight and is oriented substantially perpendicular to the adjacent constricting rings.

12. The system of claim 10 wherein the linking rib is integrally molded with the adjacent constricting rings from the same molded thermoplastic, and wherein the linking rib follows a serpentine path substantially along an outer surface of the duct.

* * * * *